United States Patent

Kasavaraju

[11] Patent Number: 5,940,515
[45] Date of Patent: Aug. 17, 1999

[54] SECURE DIALING IN MOBILE TELEPHONE SYSTEM

[75] Inventor: Ramesh Kasavaraju, San Diego, Calif.

[73] Assignee: Nokia Mobile Phones Limited, Salo, Finland

[21] Appl. No.: 08/689,738

[22] Filed: Aug. 13, 1996

[51] Int. Cl.$^6$ ............................... H04L 9/00; H04Q 7/00
[52] U.S. Cl. ............................................. 380/49; 370/329
[58] Field of Search ............................ 380/49; 370/329, 370/335, 341, 342, 364, 369; 455/579, 436, 406, 511, 410

[56] References Cited

U.S. PATENT DOCUMENTS

| | | | |
|---|---|---|---|
| 5,638,412 | 6/1997 | Blakeney, II et al. | 370/341 |
| 5,673,259 | 9/1997 | Quick, Jr. | 370/342 |
| 5,722,067 | 2/1998 | Fougnies et al. | 455/406 |
| 5,794,156 | 8/1998 | Alanara | 455/517 |
| 5,822,359 | 10/1998 | Bruckert et al. | 370/335 |

Primary Examiner—Harshad Patel
Assistant Examiner—Robin Clark
Attorney, Agent, or Firm—Perman & Green, LLP

[57] ABSTRACT

A cellular telephonic communication system is provided with privacy in the transmission of a dialed number from a mobile station to a base station. This is accomplished by transmitting from the base station a modified origination message followed by an origination continuation message. In the origination message, the dialed number is omitted. The origination message is transmitted by the access channel, and includes a control bit indicating that the origination message is incomplete and is to be followed by an origination continuation message. The base station responds by assigning forward and reverse traffic channels to the mobile station. The mobile station then employs the reverse traffic channel to transmit the dialed number to the base station. In the traffic channels, the private long code mask is employed for spreading the spectrum of the reverse traffic channel data which includes the dialed number. Thereby, an intruder listening to the telephonic communication cannot determine the identity of the called party because the intruder does not know the spreading code used.

7 Claims, 4 Drawing Sheets

SECURE DIALING IN MOBILE TELEPHONE SYSTEM

BACKGROUND OF THE INVENTION

This invention relates to the origination of a telephone call, including the dialing of a distant party, from a mobile station and, wherein, the dialed number is transmitted to the base station via the reverse traffic channel to prevent identification of the dialed digits by other stations.

One form of communication which is of interest and of great utility in the operation of cellular telephone systems is communication via CDMA (code division multiple access). Such a form of communication is currently in use in numerous cellular telephone systems. In the CDMA form of communication, signals transmitted and received by a mobile telephone comprise digitally encoded messages modulated onto carriers using a spread spectrum. Reverse traffic and the access channels are direct sequence spread by use of a long code which is a pseudo-random binary sequence. Each chip of the long code is generated by a long code generator, and the particular long code sequence is determined by a long code mask input to the long code generator.

The operation of CDMA cellular telephone communication in accordance with IS-95 is well known, this being the mobile station-base station compatibility standard for dual-mode wide band spread spectrum cellular system of IS-95A. The long code mask for the access channel is generally known by any mobile station. Due to the long code mask of the access channel being known, interception and decoding of messages transmitted on the access channel is possible and relatively simple. The reverse traffic is more secure because the long code mask is not generally known. The identification of all telephones is accomplished by assigning different long code masks to the respective telephones.

Four channels are used for two-way communication between mobile station and base station, these channels being a paging channel, an access channel, a forward traffic channel, and a reverse traffic channel. The paging channel and the forward traffic channel are on a first carrier frequency or spectrum, and serve for communication from the base station to a mobile station. The access channel and the reverse traffic channel are on a second carrier frequency or spectrum, and serve for communication from the mobile station to the base station. The paging channel is distinguishable from the forward traffic channel by virtue of the Walsh coding; and the access channel is distinguishable from the reverse traffic channel by virtue of the Walsh coding. The first and the second carrier frequencies, or spectra, are shared by all mobile telephones communicating with a common base station. The spectral separation of the two carrier frequencies is sufficient to allow independent operation of the telephone transmission and receiving circuits.

To initiate a telephonic communication, a mobile station employs the access channel to contact the base station, and to supply to the base station the dialing number of the called party and the identification of the mobile station. Subsequent communication between the calling and the called parties via the base station is accomplished via the traffic channels. In the use of the traffic channels, the long code mask is made private and makes traffic data unintelligible to an intruder. Decryption is available only to the base station since only the base station knows the private long code mask. Such encryption is not employed in the use of the access channel. As a result, the identifications of the called and the calling parties can be obtained by an intruder having suitable receiving equipment for listening to the telephone traffic.

Thus a problem exists in that, generally, people prefer to keep their telephone communications private. However, at the present time, an intruder can identify the called parties.

SUMMARY OF THE INVENTION

The foregoing problem is overcome and other advantages are provided by a mobile telephone system wherein, in accordance with the invention, initiation of a telephonic communication is accomplished by the transmittal of a modified origination message from the calling station to the base station. In the modified origination message, the calling number is deleted. Thereby, an intruder cannot learn the identity of the called party. The modified origination message serves the function of initiating communication with the base station via the traffic channels which are secure. Further security can be obtained by operating the traffic channels in the privacy mode wherein the entire communication is encrypted.

Once the two-way communication between the calling station and the base station has commenced, the dialed number is transmitted via the reverse traffic channel from the calling station to the base station. The base station then proceeds, in accordance with normal procedures, to contact the called party, thereby to provide communication between the calling and the called parties. For example, in the case wherein the called party is another mobile station within the region of the base station, the base station contacts the called party via the paging channel. The transmission via the paging channel includes the dialed number, and may include optionally the identification of the calling party, depending on the practice of the base station. For maximum security, it is preferable that the identification of the calling party be excluded from the paging message.

The invention is understood to apply to radio telephones generally, whether the radio telephone be a mobile telephone or a fixed telephone situated at a fixed location. The invention is of greatest interest in the case of mobile telephones and, accordingly, the mobile telephone is to be employed in the ensuing description of the invention. The invention is readily implemented without additional hardware by use of existing number fields within the access channel. Thereby, the entire process of the invention can be accomplished automatically.

BRIEF DESCRIPTION OF THE DRAWING

The aforementioned aspects and other features of the invention are explained in the following description, taken in connection with the accompanying drawing figures wherein.

Identically labeled elements appearing in different ones of the figures refer to the same element but may not be referenced in the description for all Figures.

DETAILED DESCRIPTION

Figure 1:
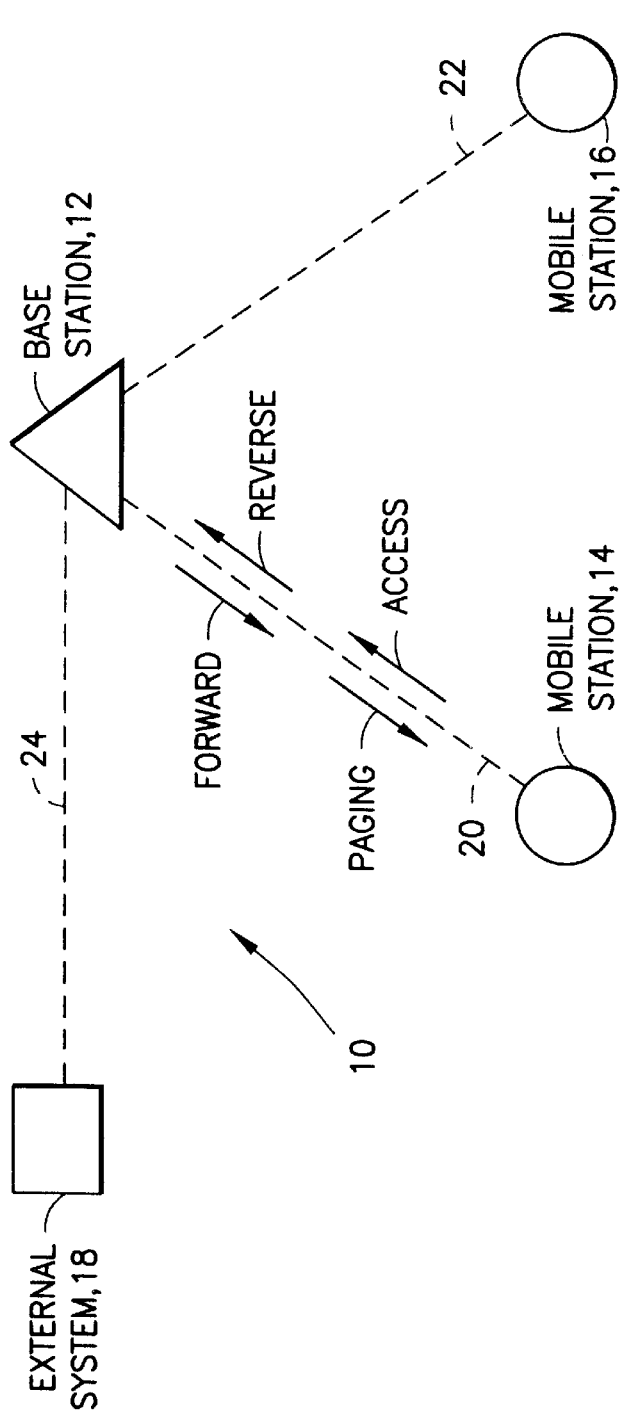
FIG. 1 shows diagrammatically a cellular telephonic communication system.

FIG. 1 shows the cellular telephone system 10 comprising a base station 12 and a plurality of mobile stations two of which are shown at 14 and 16. Communication between the mobile stations 14 and 16 is accomplished via the base station 12. Communication of a conversation or other data from the base station 12 to the mobile station 14 is accomplished via the forward traffic channel, indicated by an arrow identified as "forward" in FIG. 1. Also identified in FIG. 1 are the reverse traffic channel, the access channel, and the paging channel. Communication of conversation or other data from the mobile station 14 to the base station 12 is accomplished via the reverse traffic channel. The access channel is employed by a mobile station 14 for calling another party to initiate a telephonic communication. The paging channel is employed by the base station 12 to page a called party to answer a telephone. Also shown in FIG. 1 is an external telephone system 18 in communication with the base station 12. The external system 18 may represent the base station of another cellular system, or may represent a fixed or airborne or satellite communication device. Communication links between the base station 12 and the mobile stations 14, 16 and the external system 18 are shown by dashed lines at 20, 22, and 24, respectively.

Figure 2:
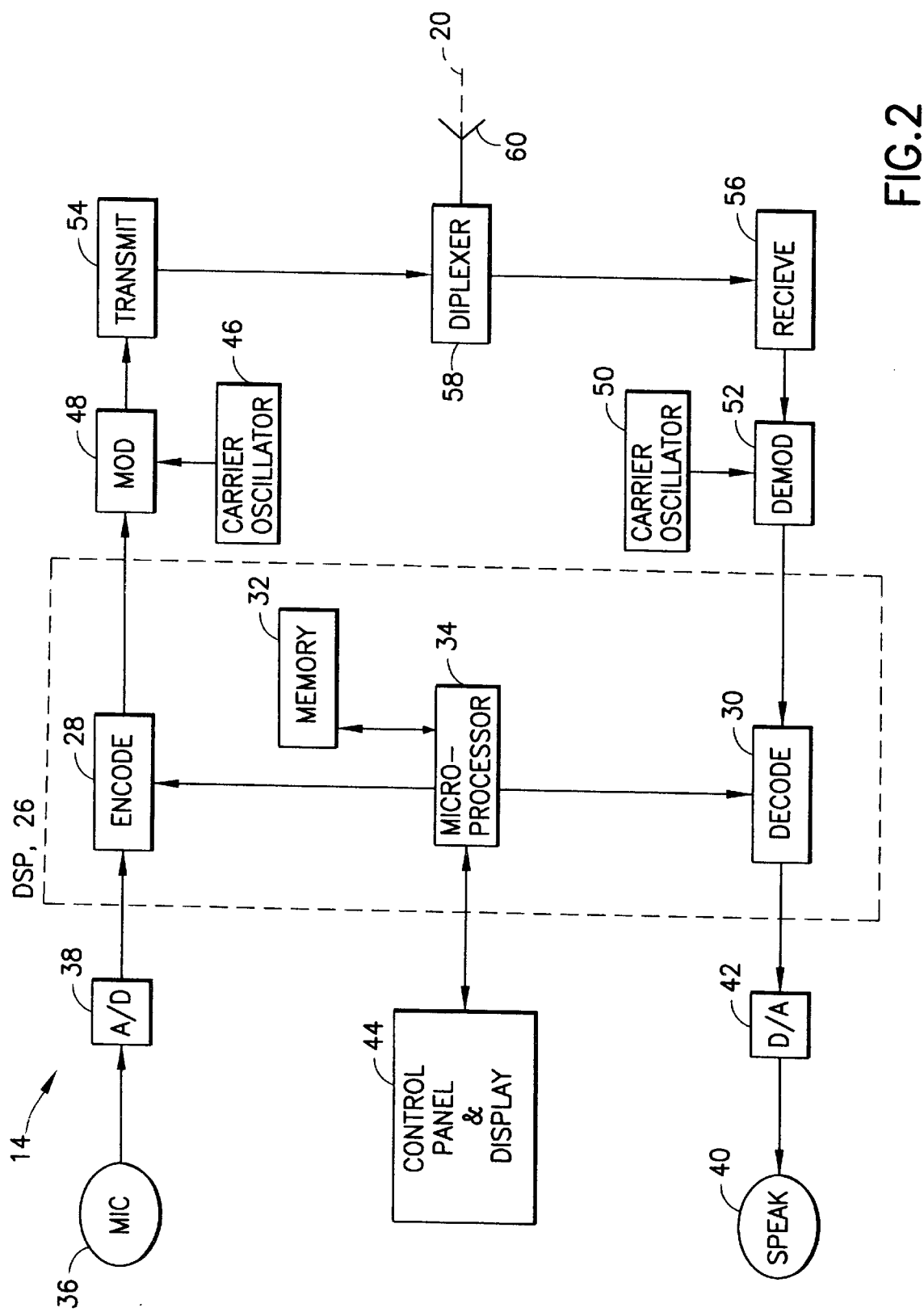
FIG. 2 is a simplified block diagram of a mobile station of FIG. 1, the diagram showing components of the mobile station employed in the practice of the invention.

FIG. 2 shows components of the mobile station 14. it being understood that the other mobile stations, such as the mobile station 16 have the same components and configuration. The mobile station 14 comprises a digital signal processor (DSP) 26 which includes an encoder 28, a decoder 30, a memory 32, and a microprocessor 34. A microphone 36 connects via an analog-to-digital converter 38 to an input terminal of the encoder 28. A speaker 40 connects via a digital-to-analog converter 42 to an output terminal of the decoder 30. A display 44 with a control panel interconnects with the microprocessor 34 for selection of telephone functions of the station 14. Also included within the mobile station 14 is a carrier oscillator 46 for providing the up-link carrier frequency for communication to the base station 12, a carrier signal of the oscillator 46 connecting with a modulator 48. An output encoded signal of the encoder 28 is applied to the modulator 48 to be modulated onto the carrier of the oscillator 46. A further oscillator 50 provides a carrier frequency for demodulation of the down-link signal received at the mobile station 14 from the base station 12. A demodulator 52 employs the down-link carrier of the oscillator 50, and presents the demodulated signal to an input terminal of the decoder 30. Also included in the mobile station 14 is a transmitter 54, a receiver 56, a diplexer 58, and an antenna 60 which connects with the diplexer 58. The transmitter 54 is connected between the modulator 48 and the diplexer 58, and serves to amplify and transmit the signal outputted by the modulator 48. The signal outputted by the transmitter 54 is coupled by the diplexer 58 to the antenna 60. The receiver 58 receives the signal coupled thereto via the antenna 60 and the diplexer 58. The receiver 56 amplifies and filters the received signal and applies the received signal to an input terminal of the demodulator 52.

In the practice of the invention, the memory 32 stores the necessary data for creating the various data fields of an outgoing origination message to be transmitted via the access channel for initiating telephonic communication. The memory 32 also stores data for digitally formatting other messages with their data fields, as may be transmitted via the station 14, stores the requisite data and instructions for use in the decoding operation of the decoder 30, and stores instructions for data compression and expansion. The functions of data compression and expansion circuitry, which process respectively output data of the encoder 28 and input data to the decoder 30, are well known and have been deleted from FIG. 2 for simplicity. The microprocessor 34, in response to commands inputted at the display/control panel 44, provides for the origination message and origination continuation message, including the mobile station identifier, a designation as to whether the privacy mode is desired, a control bit which indicates whether there are more fields as is the case wherein the origination continuation message is employed, and entries to be placed in the dialed number field. The microprocessor 34 also provides the usual control functions whereby the mobile station 14 can initiate a telephonic communication, and can respond to a paging for a telephonic communication originated by a distant party.

Figure 3:
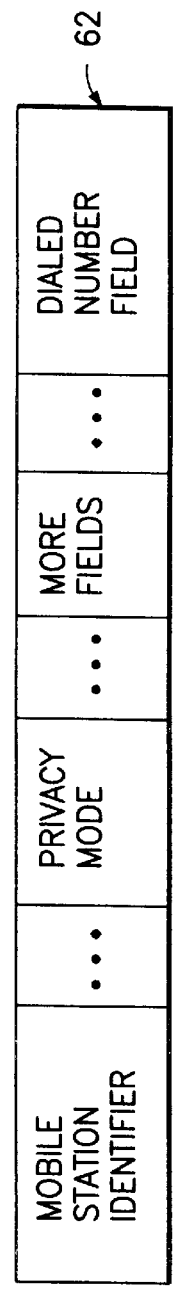
FIG. 3 shows, diagrammatically, an arrangement of fields in a digitally encoded message employed by the mobile station of FIG. 2.

FIG. 3 shows a digitally formatted message 62 to be communicated via the access channel, the message 62 having a plurality of data fields, as is well known. Four of the data fields are presented in FIG. 3, these data fields being a mobile station identifier, a request for the privacy mode, and indication of more fields to follow, and a dialed number field reserved for a dialed number. The privacy mode is employed optionally with the invention and, as is well known, is represented in the privacy mode field by a single digit which is a binary digit 1 for requesting implementation of the private long code, or a binary digit 0 in the event that telephonic communication is to be implemented without the privacy mode. The privacy mode field is described by international standard TIA/EIA/IS-95-A, page 1–7 and 1–11.

In accordance with the invention, the dialed number is not transmitted via the access channel to the base station, but, rather, is to be transmitted over the reverse traffic channel by use of an origination continuation message, such message being described in the international standard TIA/EIA/IS-95-A, page 6–237. The origination message is set by setting the appropriate message fields. These fields which are relevant to the practice of the invention are identified as MORE_FIELDS and NUM_FIELDS. In the practice of the invention, the MORE_FIELDS is set with the binary digit 1 which indicates that the present message is not complete because of the omission of the dialed number in the dialed number field. Furthermore, the dialed number field, NUM_FIELDS, is set to 0 to show that this origination message does not contain any dialed number. The modified origination message, as shown at 62 in FIG. 3, is understood by the base station 12, (FIG. 1) as a request to initiate further communication with the base station by a traffic channel in the nature of the origination continuation message containing the dialed number. Upon receipt of the dialed number at the base station 12, the base station 12 initiates the standard procedures, as are well known, for contacting the called party as identified by the dialed number. This is followed, in the usual well known fashion, by a response of the called party to the base station 12 indicating that the called party is ready for communication with the calling party. Thereupon, communication begins via the traffic channels between the calling and the called parties.

In the foregoing sequence of events, the communication of the origination communication message via the traffic channel provides a secure mode of communication of the dialed number to the base station. The secure communication is present because of the aforementioned encryption of the traffic channels, namely, both the forward traffic channel and the reverse traffic channel. Thereby, the invention has attained its object of allowing a calling party to initiate a telephonic communication without divulging the dialed number to a possible intruder. The security can be enhanced by use of the privacy mode wherein the base station sends the "long code transition request order" (the request for privacy), thereby implementing the private long code which substantially increases the traffic channel privacy. The mobile station then sends the origination continuation message with the dialed digits included and the encryption field being on (the optional privacy mode). This provides still greater privacy to the calling party in the transmission of the dialed number.

Figure 4:
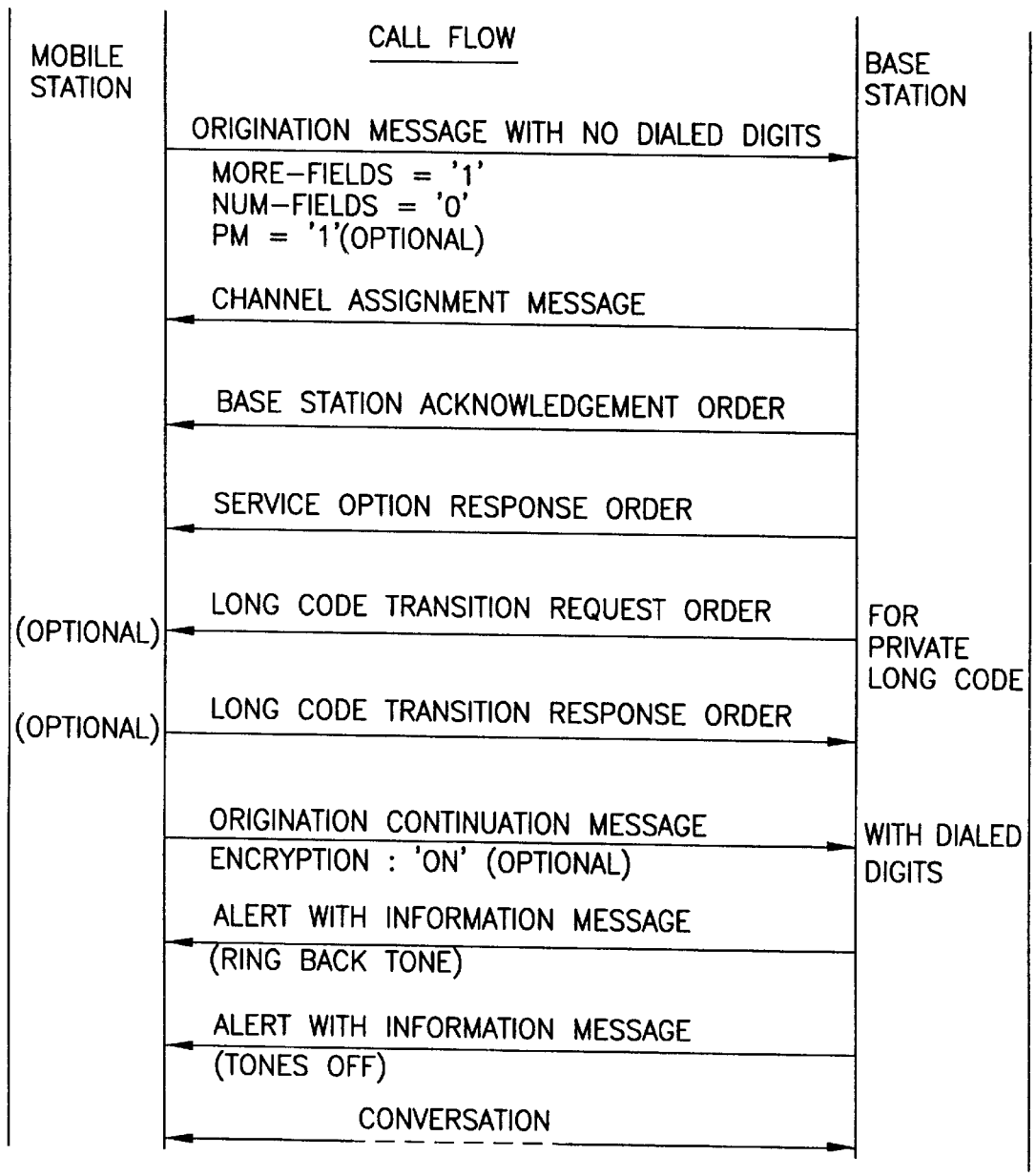
FIG. 4 is a timing diagram showing a succession of control signals transmitted between mobile and base stations of FIG. 1.

FIG. 4 is a timing diagram showing the sequence of messages transmitted between the mobile station and the base station for initiating communication between the calling party and the called party. The messages are indicated by a set of lines which are labeled to indicate the nature of the message. The flow of time is from the top of the diagram to the bottom of the diagram. The sequence of messages is as follows.

First, the origination message is sent from the mobile station to the base station with no dialed digits being present in the origination message. In the origination message, the More_Fields is set equal to 1 and the Num_Fields is set equal to 0. The optional privacy mode (PM) may be set equal to 1 for implementation of the privacy mode. The base station responds with a channel assignment message and an acknowledgement of the order to initiate the telephonic communication. This is followed by a further message indicating a service option response order and a further optional message, in the case of the privacy mode identified as the long code transition request order.

The mobile station then responds, in the case of the privacy mode, with a long code transition response order. There follows a further message independently of whether the privacy mode has been selected or not, this message being the origination continuation message which includes the dialed digits. This is transmitted via the reverse traffic channel and may be completely encrypted in the case wherein the privacy mode has been selected.

There follows a message from the base station, the message being an alert with information message, this serving as the ring back tone. There follows a further message from the base station which is an alert with information message (for tones off). Thereafter, there is conversation between the called and the calling parties.

Figure 5:
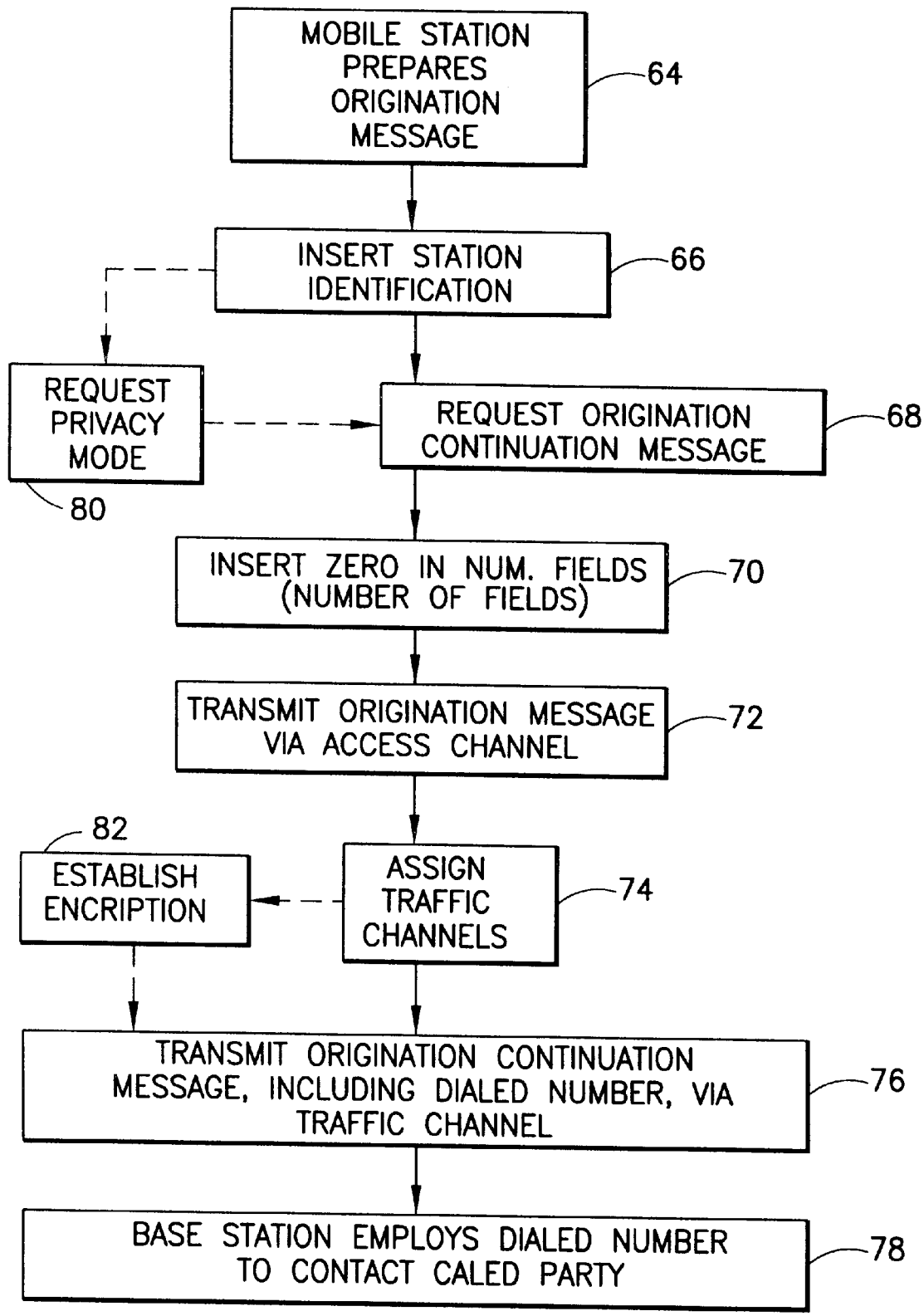
FIG. 5 is a flow chart showing a succession of steps in the practice of the procedure of the invention.

FIG. 5 is a flow chart showing steps in the procedure of the invention. The procedure begins at block 64 wherein the calling mobile station prepares an origination message with digitally formatted fields as shown for the message 62 of FIG. 3. At block 66, the identification of the mobile station is inserted into the origination message. At block 68, the control bit of the More_Fields is set to notify the base station that there is to be an origination continuation message. This is followed at block 70 by insertion of zeros for the binary digits of the NUM. FIELDS (number of fields), and no dialed number is sent.

The procedure continues at block 72 with the mobile station transmitting the origination message via the access channel to the base station. Then, at block 74, the base station assigns forward and reverse traffic channels for communication with the mobile station. Thereupon, at block 76, the mobile station transmits the origination continuation message including the dialed number via the reverse traffic channel to the base station. At block 78, the base station uses the dialed number in a paging channel to establish communication with the called mobile station. Alternatively, in the event that the called party is within another telephone system external to the region of the base station, the base station uses the dialed number to contact the external telephone system to establish communication with the called party.

Alternatively, for implementing the privacy mode, the procedure passes from block 66 to block 68 via block 80 which provides for insertion of the request for the privacy mode. This is accomplished by setting the control bit of the privacy mode to the digit 1. In addition, for establishing the privacy mode, the procedure passes from block 74 to block 76 via block 82 which provides for encryption of messages sent via the forward and the reverse traffic channels. This provides for secure transmission of the dialed number from the mobile station to the base station.

It is to be understood that the above described embodiment of the invention is illustrative only, and that modifications thereof may occur to those skilled in the art. Accordingly, this invention is not to be regarded as limited to the embodiment disclosed herein, but is to be limited only as defined by the appended claims.

What is claimed is:

1. In a cellular communication system for telephonic communication between a base station and a plurality of mobile stations, a method of securely initiating a telephonic communication by a mobile station, comprising the steps of:

transmitting, via, an access channel, a modified origination message from a mobile station to a base station, the modified origination message having a dialed number field set to show an absence of a dialed number, and a More_Field set to indicate a following origination continuation message;

placing the dialed number in the origination continuation message;

transmitting the origination continuation message from the mobile station to the base station via a traffic channel; and providing greater security to said traffic channel than to said access channel.

2. A method according to claim 1 further comprising a step of assigning the traffic channel for communication of the origination continuation message.

3. A method according to claim 2 further comprising a step of communicating, via the base station, with a called party having the dialed number to establish a communication link between the mobile station and the called party.

4. A method according to claim 3 further comprising a step of inserting into the modified origination message a request for a privacy mode, and wherein said step of assigning a traffic channel includes a step of establishing the traffic channel with a feature of privacy mode encryption.

5. A method according to claim 1 further comprising a step of encrypting the dialing number for security from intrusion.

6. In a cellular communication system for telephonic communication between the base station and a plurality of mobile stations, a method of securely initiating a telephonic communication by a mobile station, comprising the steps of:

preparing an origination message for transmission from the mobile station to the base station via an access channel, the origination message being digitally encoded and having bit fields reserved for identification of the mobile station, a dialed number, and a control bit indicating as to whether the origination message is complete with respect to the inclusion of the dialed number;

setting the control bit to indicate that an origination continuation message is to follow the origination message;

setting the dialed number field to indicate the absence of a dialed number;

transmitting from the mobile station to the base station the origination message via the access channel;

assigning a traffic channel to the mobile station for communication with the base station;

transmitting via the traffic channel from the mobile station to the base station an origination continuation message including the dialed digits;

providing greater security to said traffic channel than to said access channel, and communicating, via the base station, with a called party having the dialed number to establish a communication link between the mobile station and the called party.

7. A method according to claim 6 further comprising a step of inserting into the modified origination message a request for a privacy mode, and wherein said step of assigning a traffic channel includes a step of establishing the traffic channel with a feature of privacy mode encryption.

* * * * *